United States Patent
Moriya et al.

(10) Patent No.: US 7,347,185 B2
(45) Date of Patent: Mar. 25, 2008

(54) UNIT AND METHOD FOR CONTROLLING INTERNAL COMBUSTION ENGINES

(75) Inventors: Hidenori Moriya, Susono (JP); Kohei Miwa, Nissin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/564,894

(22) PCT Filed: Jul. 8, 2004

(86) PCT No.: PCT/JP2004/010076

§ 371 (c)(1),
(2), (4) Date: Jan. 17, 2006

(87) PCT Pub. No.: WO2005/008051

PCT Pub. Date: Jan. 27, 2005

(65) Prior Publication Data
US 2006/0196471 A1  Sep. 7, 2006

(30) Foreign Application Priority Data
Jul. 17, 2003  (JP) ............................. 2003-276271

(51) Int. Cl.
*F02P 5/153* (2006.01)
(52) U.S. Cl. .................. 123/435; 123/406.41
(58) Field of Classification Search ............. 123/299, 123/300, 305, 406.22, 406.26, 435, 90.15, 123/406.41; 701/103–105, 111; 73/117.3, 73/118.1
See application file for complete search history.

(56) References Cited

U.S. PATENT DOCUMENTS

| 5,738,074 | A  |   | 4/1998  | Nakamura et al. |
| 5,778,857 | A  |   | 7/1998  | Nakamura et al. |
| 6,557,526 | B1 | * | 5/2003  | Hoshino ................ 123/406.26 |
| 6,840,218 | B2 | * | 1/2005  | Scholl et al. ............... 123/435 |
| 6,994,077 | B2 | * | 2/2006  | Kobayashi et al. .... 123/568.11 |
| 7,021,286 | B2 | * | 4/2006  | Yoshino et al. ........ 123/406.29 |
| 7,146,964 | B2 | * | 12/2006 | Norimoto et al. ........... 123/435 |
| 7,207,316 | B2 | * | 4/2007  | Moriya et al. .............. 123/435 |
| 2006/0150953 | A1 | * | 7/2006 | Moriya et al. .............. 123/435 |

FOREIGN PATENT DOCUMENTS

| EP | 8 103 62 A2 | 12/1997 |
| JP | A 63-097873 | 4/1988 |

(Continued)

*Primary Examiner*—Hai Huynh
(74) *Attorney, Agent, or Firm*—Oliff & Berridge, PLC

(57) ABSTRACT

An internal combustion engine (1) generates power by burning a mixture of fuel and air in a combustion chamber (3). The internal combustion engine (1) is provided with a crank angle sensor (14), an in-cylinder pressure sensor (15) detecting an in-cylinder pressure at the time when a crank angle detected by the crank angle sensor (14) reaches a predetermined angle, and an ECU (20). The ECU (20) calculates a combustion rate at predetermined timing based upon a control parameter which is a product of an in-cylinder pressure detected by the in-cylinder pressure sensor (15) and a value obtained by exponentiating an in-cylinder volume at the timing of detecting the in-cylinder pressure with a predetermined index, and corrects ignition timing by each ignition plug (7) so that the calculated combustion rate is equal to a target value.

11 Claims, 6 Drawing Sheets

FOREIGN PATENT DOCUMENTS

| | | | |
|---|---|---|---|
| JP | A 02-204662 | | 8/1990 |
| JP | A 03-233162 | | 10/1991 |
| JP | A 07-042607 | | 2/1995 |
| JP | A 07-180645 | | 7/1995 |
| JP | A 08-232820 | | 9/1996 |
| JP | 8-312407 | * | 11/1996 |
| JP | A 09-189281 | | 7/1997 |
| JP | A 09-250435 | | 9/1997 |
| JP | A 9-273436 | | 10/1997 |
| JP | A 9-273437 | | 10/1997 |
| JP | A 9-273468 | | 10/1997 |
| JP | A 9-317522 | | 12/1997 |
| JP | A 11-125141 | | 5/1999 |
| JP | A 2002-097996 | | 4/2002 |
| JP | 2005-36754 | * | 2/2005 |
| JP | 2005-320872 | * | 11/2005 |
| JP | 2005-351147 | * | 12/2005 |

* cited by examiner

UNIT AND METHOD FOR CONTROLLING INTERNAL COMBUSTION ENGINES

TECHNICAL FIELD

The present invention relates to a control apparatus and a control method for an internal combustion engine which generates power by burning a mixture of fuel and air in a cylinder.

BACKGROUND ART

Generally, an internal combustion engine does not produce torque when the timing of combustion starting (spark ignition timing or compression ignition timing) of a mixture in a cylinder thereof is lagged and conversely, an excessive advance in spark or firing timing causes knocking. Therefore, the timing of the combustion starting in a cylinder for an internal combustion engine is preferably set to proper timing (M B T: Minimum advance for Best Torque) for large torque within the extent that knocking does not occur, based upon an engine rotation speed, a throttle valve opening or the like. Patent Document 1, as a control apparatus for an internal combustion engine in order to provide such M B T, has disclosed a control apparatus which advances or retards the timing of combustion starting based upon a combustion rate in a cylinder. In the control apparatus, the combustion rate is determined based upon a heat generation rate or in-cylinder pressures at three points or more including crank angle timing for the combustion rate.

In addition, the above-mentioned M B T is in the vicinity of the spark ignition or compression ignition timing at which knocking possibly occurs and therefore, the timing of the combustion starting is advanced as much as possible while preventing occurrence of the knocking, thus making the timing of the combustion starting be close to the M B T and enabling generation of large torque in an internal combustion engine. Patent Document 2, as a control apparatus for an internal combustion engine to perform such M B T control, has disclosed a control apparatus which utilizes the phenomenon that a heat generation rate in a cylinder increases temporarily and also sharply caused by the occurrence of knocking. This control apparatus determines a heat generation rate from an in-cylinder pressure sampled by in-cylinder pressure detecting means and judges whether or not the engine is in nearly close to a state of the knocking based upon a changing rate of a heat generation rate in the region from a point the determined heat generation rate becomes the maximum to a point of combustion completion.

The above-mentioned conventional control apparatus for the internal combustion engine basically performs processing of the in-cylinder pressures detected by the in-cylinder pressure detecting means for every minute crank angle, thus providing the heat generation rate. As a result, the calculating loads in the conventional control apparatus become remarkably large and therefore, it is practically difficult to apply the conventional control apparatus to an internal combustion engine for a vehicle, for example. In addition, even if the combustion rate is determined based upon in-cylinder pressures at about three points by the conventional method, an accurate M B T control which is practically usable can not be achieved.

(Patent Document 1) Japanese Patent Application Laid-Open No. 9 (1997)-189281

(Patent Document 2) Japanese Patent Application Laid-Open No. 2 (1990)-204662

DISCLOSURE OF THE INVENTION

It is an object of the present invention to provide a control apparatus and a control method for an internal combustion engine which is useful and capable of simply carrying out highly-accurate control of timing of combustion starting with less load.

A control apparatus for an internal combustion engine according to the present invention is characterized in that a control apparatus for an internal combustion engine which generates power by burning a mixture of fuel and air in a cylinder thereof comprises in-cylinder pressure detecting means, calculating means to calculate a combustion rate at predetermined timing based upon the in-cylinder pressure detected by the in-cylinder pressure detecting means and an in-cylinder volume at timing of detecting the in-cylinder pressure and correction means to correct timing of combustion starting in the cylinder so that the combustion rate calculated by the calculating means is equal to a target value.

It is preferable that the calculating means calculates the combustion rate at the predetermined timing based upon a control parameter including a product of the in-cylinder pressure detected by the in-cylinder pressure detecting means and a value obtained by exponentiating the in-cylinder volume at the timing of detecting the in-cylinder pressure with a predetermined index.

It is preferable that the predetermined timing is set between first timing set after the opening of an intake valve and before the combustion starting and second timing set after the combustion starting and before the opening of an exhaust valve, and the calculating means calculates the combustion rate based upon a difference in the control parameter between the first and the second timing and a difference in the control parameter between the first timing and the predetermined timing.

A control apparatus for an internal combustion engine as an alternative according to the present invention is characterized in that a control apparatus for an internal combustion engine which generates power by burning a mixture of fuel and air in a cylinder thereof comprises in-cylinder pressure detecting means, calculating means to calculate a heat generation rate at predetermined timing based upon the in-cylinder pressure detected by the in-cylinder pressure detecting means and an in-cylinder volume at timing of detecting the in-cylinder pressure and correction means to correct timing of combustion starting in the cylinder based upon the heat generation rate calculated by the calculating means.

It is preferable that the calculating means calculates the heat generation rate at the predetermined timing based upon a control parameter including a product of the in-cylinder pressure detected by the in-cylinder pressure detecting means and a value obtained by exponentiating the in-cylinder volume at the timing of detecting the in-cylinder pressure with a predetermined index.

It is preferable that the calculating means calculates the heat generation rate based upon a difference in the control parameter between tow predetermined points.

A control method for an internal combustion engine according to the present invention is characterized in that a control method for an internal combustion engine which generates power by burning a mixture of fuel and air comprises the steps of:

(a) detecting an in-cylinder pressure;

(b) calculating a combustion rate at predetermined timing based upon the in-cylinder pressure detected in the step (a) and an in-cylinder volume at timing of detecting the in-cylinder pressure; and (c) correcting timing of combustion starting in the cylinder so that the combustion rate calculated in the step (b) is equal to a target value.

It is preferable that the step (b) includes calculating the combustion rate at the predetermined timing based upon a control parameter including a product of the in-cylinder pressure detected in the step (a) and a value obtained by exponentiating the in-cylinder volume at the timing of detecting the in-cylinder pressure with a predetermined index.

It is preferable that the predetermined timing is set between first timing set after the opening of an intake valve and before the combustion starting and second timing set after the combustion starting and before the opening of an exhaust valve, and in the step (b), the combustion rate is calculated based upon a difference in the control parameter between the first and the second timing and a difference in the control parameter between the first timing and the predetermined timing.

A control method for an internal combustion engine as an alternative according to the present invention is characterized in that a control method for an internal combustion engine which generates power by burning a mixture of fuel and air comprises the steps of:

(a) detecting an in-cylinder pressure;

(b) calculating a heat generation rate at predetermined timing based upon the in-cylinder pressure detected in the step (a) and an in-cylinder volume at timing of detecting the in-cylinder pressure; and (c) correcting timing of combustion-starting in the cylinder based upon the heat generation rate calculated in the step (b).

It is preferable that the step (b) includes calculating the heat production rate at the predetermined timing based upon a control parameter including a product of the in-cylinder pressure detected in the step (a) and a value obtained by exponentiating the in-cylinder volume at the timing of detecting the in-cylinder pressure with a predetermined index.

It is preferable that the step (b) includes calculating the heat generation rate based upon a difference in the control parameter between two predetermined points.

BEST MODE FOR CARRYING OUT THE INVENTION

Figure 1:
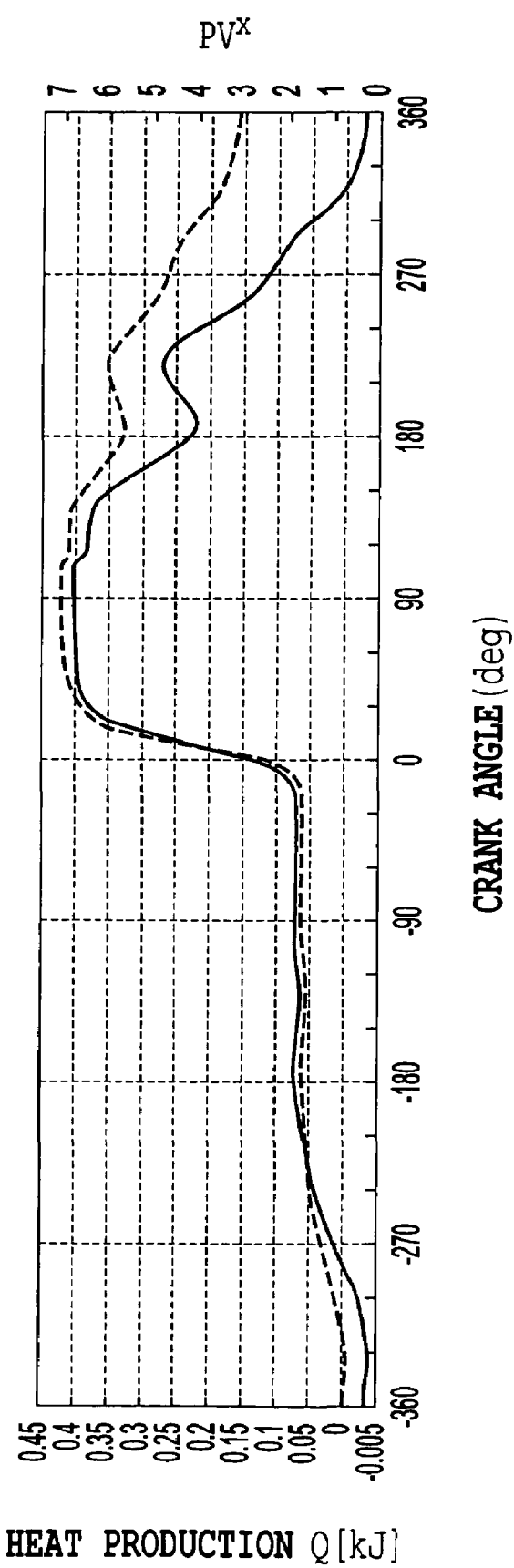
FIG. 1 is a graph showing a correlation between a control parameter $PV^\kappa$ used in the present invention and heat production in a combustion chamber.

The inventors have devoted themselves to the study for enabling a highly accurate control for timing of combustion starting in a cylinder for an internal combustion engine (ignition timing in a gasoline engine, and firing timing in a diesel engine) with reduction of calculation loads thereon. The inventors has resulted in recognizing a control parameter calculated based upon an in-cylinder pressure detected by in-cylinder pressure detecting means and an in-cylinder volume at timing of detecting the in-cylinder pressure. In more detail, when an in-cylinder pressure detected by in-cylinder pressure detecting means at a crank angle of $\theta$ is set as $P(\theta)$, an in-cylinder volume at a crank angle of $\theta$ is set as $V(\theta)$ and a ratio of specific heat is set as $\kappa$, the inventors have focused attention on a control parameter $P(\theta) \cdot V^\kappa(\theta)$ (hereinafter referred to as $P V^\kappa$ properly) obtained as a product of the in-cylinder pressure $P(\theta)$ and a value $V^\kappa(\theta)$ produced by exponentiating the in-cylinder volume $V(\theta)$ with a ratio $\kappa$ of specific heat (a predetermined index). In addition, the inventors have found out that there is a correlation, as shown in FIG. 1, between a changing pattern of heat production Q in a cylinder for an internal combustion engine to a crank angle and a changing pattern of a control parameter $P V^\kappa$ to a crank angle. It should be noted that in FIG. 1, $-360°$, $0°$ and $360°$ respectively correspond to a top dead center, and $-180°$ and $180°$ respectively correspond to a bottom dead center.

In FIG. 1, a solid line is produced by plotting control parameters $PV^\kappa$, each of which is a product of an in-cylinder pressure in a predetermined model cylinder detected for every predetermined minute crank angle and a value obtained by exponentiating an in-cylinder volume at timing of detecting the in-cylinder pressure with a predetermined ratio $\kappa$ of specific heat. In addition, in FIG. 1, a dotted line is produced by calculating and plotting heat production Q in the model cylinder based upon the following formula (1) as $Q = \int dQ$. It should be noted that in any case, $\kappa = 1.32$ for simplicity.

[Expression 1]

$$\frac{dQ}{d\theta} = \left\{ \frac{dP}{d\theta} \cdot V + \kappa \cdot P \cdot \frac{dV}{d\theta} \right\} \cdot \frac{1}{\kappa - 1} \qquad (1)$$

As seen from the result shown in FIG. 1, a changing pattern of heat production Q to a crank angle is generally identical (similarity) to a changing pattern of a control pattern $P V^\kappa$ to a crank angle and in particular, it is found out that, after and before the combustion starting (at the spark igniting time in a gasoline engine and at the compression igniting time in a diesel engine) of a mixture in a cylinder (for example, the range of from about $-180°$ to about $135°$ in FIG. 1), the changing pattern of the heat production Q is extremely identical to the changing pattern of the control parameter $P V^\kappa$.

According to one aspect of the present invention, a combustion rate (M F B) which is a ratio of heat production to a predetermined timing between two points to a sum of the heat production between the two points based upon a control parameter $P V^\kappa$ calculated based upon an in-cylinder pressure detected by in-cylinder pressure detecting means and an in-cylinder volume at timing of detecting the in-cylinder pressure by using a correlation between the heat production Q and the control parameter P V$^\kappa$ found out newly in this way. Herein, when the combustion rate in the cylinder is calculated based upon the control parameter P V$^\kappa$, the combustion rate in the cylinder can be accurately produced without requiring calculation processing with high loads. That is, as shown in FIG. 2, the combustion rate (refer to a solid line in the same figure) determined based upon the control parameter P V$^\kappa$ is substantially equal to the combustion rate (refer to a dotted line in the same figure) determined based upon the heat generation rate.

Figure 2:
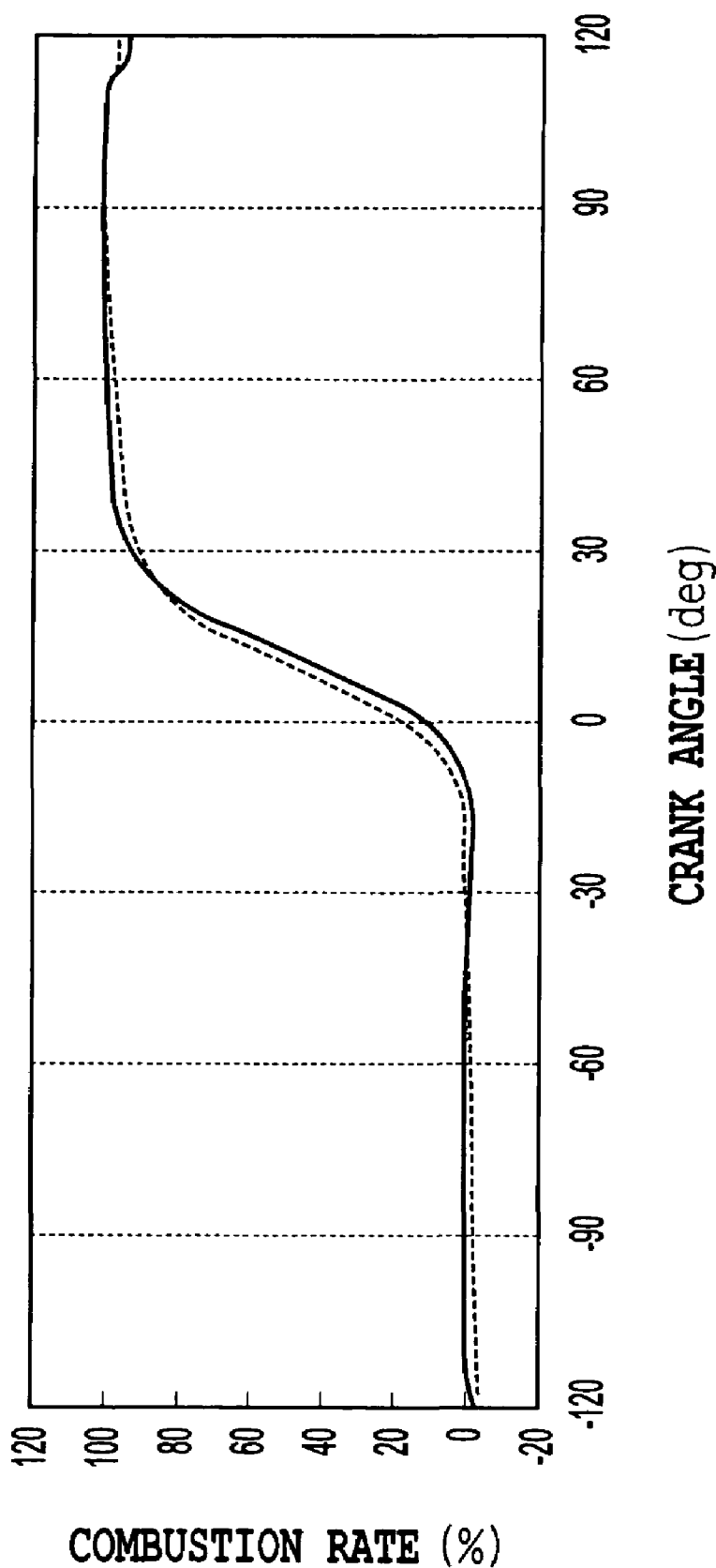
FIG. 2 is a graph showing a correlation between a combustion rate determined based upon the control parameter $PV^\kappa$ and a combustion rate determined based upon a heat generation rate.

In FIG. 2, a solid line is made by plotting a combustion rate at timing when a crank angle=θ in the model cylinder wherein the combustion rate is determined by substituting the detected in-cylinder pressure P (θ) into the following (2) expression. Note that for simplicity, κ=1.32.

[Expression 2]

$$MFB = \frac{P(\theta) \cdot V^\kappa - P(-120°) \cdot V^\kappa(-120°)}{P(120°) \cdot V^\kappa(120°) - P(-120°) \cdot V^\kappa(-120°)} \times 100(\%) \quad (2)$$

In addition, in FIG. 2, a dotted line is made by plotting a combustion rate at timing when a crank angle=θ in the model cylinder wherein the combustion rate is determined by substituting the detected in-cylinder pressure P (θ) into the above (1) expression and the following (3) expression. In this case, for simplicity, κ=1.32.

[Expression 3]

$$\text{Combustion Rate} = \frac{\int_{-120°}^{\theta} dQ}{\int_{-120°}^{120°} dQ} \quad (3)$$

According to one aspect of the present invention, timing (spark ignition timing or compression ignition timing) of combustion starting in a cylinder is corrected so that a combustion rate determined based upon a control parameter P V$^\kappa$ calculated from an in-cylinder pressure detected by the in-cylinder detecting means and an in-cylinder volume at timing of detecting the in-cylinder pressure is equal to a target value. That is, since the combustion rate in optimal timing (MBT) of the combustion starting can be determined experimentally and experientially, the timing of the combustion starting in the cylinder is corrected so that the combustion rate determined based upon the control parameter P V$^\kappa$ is equal to a target value, whereby it is possible to simply optimize the timing of the combustion starting in the cylinder with low loads, thus producing large torque from an internal combustion engine without occurrence of knocking.

It is preferable that a combustion rate is calculated at predetermined timing between first timing at a crank angle of θ1 set after the opening of an intake valve and before combustion starting and second timing at a crank angle of θ2 set after combustion starting and before the opening of an exhaust valve in the event of controlling the timing of the combustion starting. In this case, when the crank angle at the predetermined timing is θ0, a combustion rate (MFB) of the predetermined timing can be determined by multiplying with 100 a value obtained by dividing a difference {P(θ0)·V$^\kappa$ (θ0)−P(θ1)·V$^\kappa$ (θ1)} of the control parameter P V$^\kappa$ between the first timing and the predetermined timing by a difference {P(θ2)·V$^\kappa$ (θ2)−P(θ1)·V$^\kappa$ (θ1)} of the control parameter P V$^\kappa$ between the first timing and the second timing. This allows the combustion rate to be accurately determined based upon the in-cylinder pressures detected at three points, making it possible to optimize the timing of the combustion starting in the cylinder with large reduction of calculating loads.

According to another aspect of the present invention, a heat production rate is determined based upon a control parameter P V$^\kappa$ calculated from an in-cylinder pressure detected by in-cylinder detecting means and an in-cylinder volume at timing of detecting the in-cylinder pressure by using a correlation between the above heat production Q and the control parameter P V$^\kappa$. That is, a heat production rate at any timing (at timing when a crank angle=θ), by using the control parameter P V$^\kappa$, is represented as a difference in control parameter P V$^\kappa$ between two predetermined points (between a minute crank angle δ), i.e. as

[Expression 4]

$$d(PV^\kappa) = \frac{1}{\delta}\{P(\theta + \delta) \cdot V^\kappa(\theta + \delta) - P(\theta) \cdot V^\kappa(\theta)\}. \quad (4)$$

Figure 3:
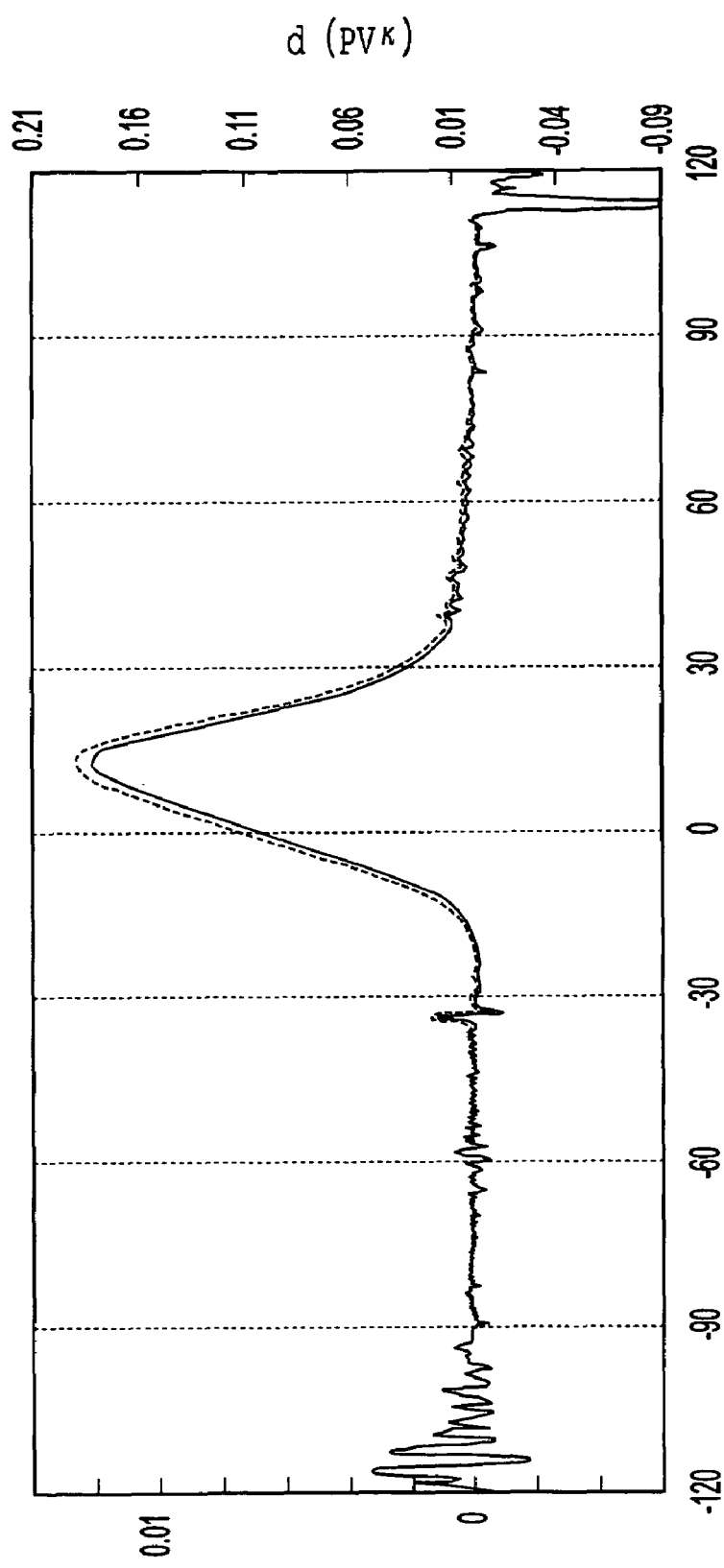
FIG. 3 is a graph showing a correlation between a heat production rate determined based upon the control parameter $PV^\kappa$ and a heat production rate determined according to a theoretical formula.

Herein, in FIG. 3, a solid line is made by calculating and plotting D(P V$^\kappa$) at timing when a crank angle=θ in the model cylinder based upon an in-cylinder pressure P(θ). Note that for simplicity, κ=1.32 and δ=1° (1 CA). In addition, in FIG. 3, a dotted line is made by calculating and plotting a heat production rate at timing when a crank angle=θ in the model cylinder wherein the heat production rate is determined by substituting the in-cylinder pressure P (θ) into the above (1) expression. In this case, for simplicity, κ=1.32. As seen in FIG. 3, a changing pattern (refer to a solid line in FIG. 3) of d (P V$^\kappa$) to a crank angle is substantially equal (similarity) to a changing pattern (refer to a dotted line in the same figure) of the heat production rate to a crank angle determined based upon (1) expression. Accordingly, it is possible to accurately provide the heat production rate in the cylinder without requiring calculating processing with high loads by using the control parameter P V$^\kappa$.

According to this aspect, timing (spark ignition timing or compression ignition timing) of combustion starting in a cylinder is corrected based upon d (P V$^\kappa$) as a heat production rate determined based upon a control parameter P V$^\kappa$ calculated from an in-cylinder pressure detected by the in-cylinder detecting means and an in-cylinder volume at timing of detecting the in-cylinder pressure. That is, it is known that optimal timing of combustion starting for producing large torque is in the vicinity of ignition or firing timing possibly generating knocking, and when knocking occurs, a heat production rate in a cylinder temporarily and sharply increases and thereafter, decreases rapidly (combustion early ends). Accordingly, d (P V$^\kappa$) as a heat production rate is determined based upon a control parameter P V$^\kappa$ and the timing of combustion starting in a cylinder is corrected in accordance with an occurrence state of the knocking obtained from the d (P V$^\kappa$). As a result, it is possible to simply optimize the timing of the combustion starting in the cylinder with less load, thus producing large torque from an internal combustion engine without the occurrence of the knocking.

The best mode for carrying out the present invention will be hereinafter explained in detail with reference to the drawings.

Figure 4:
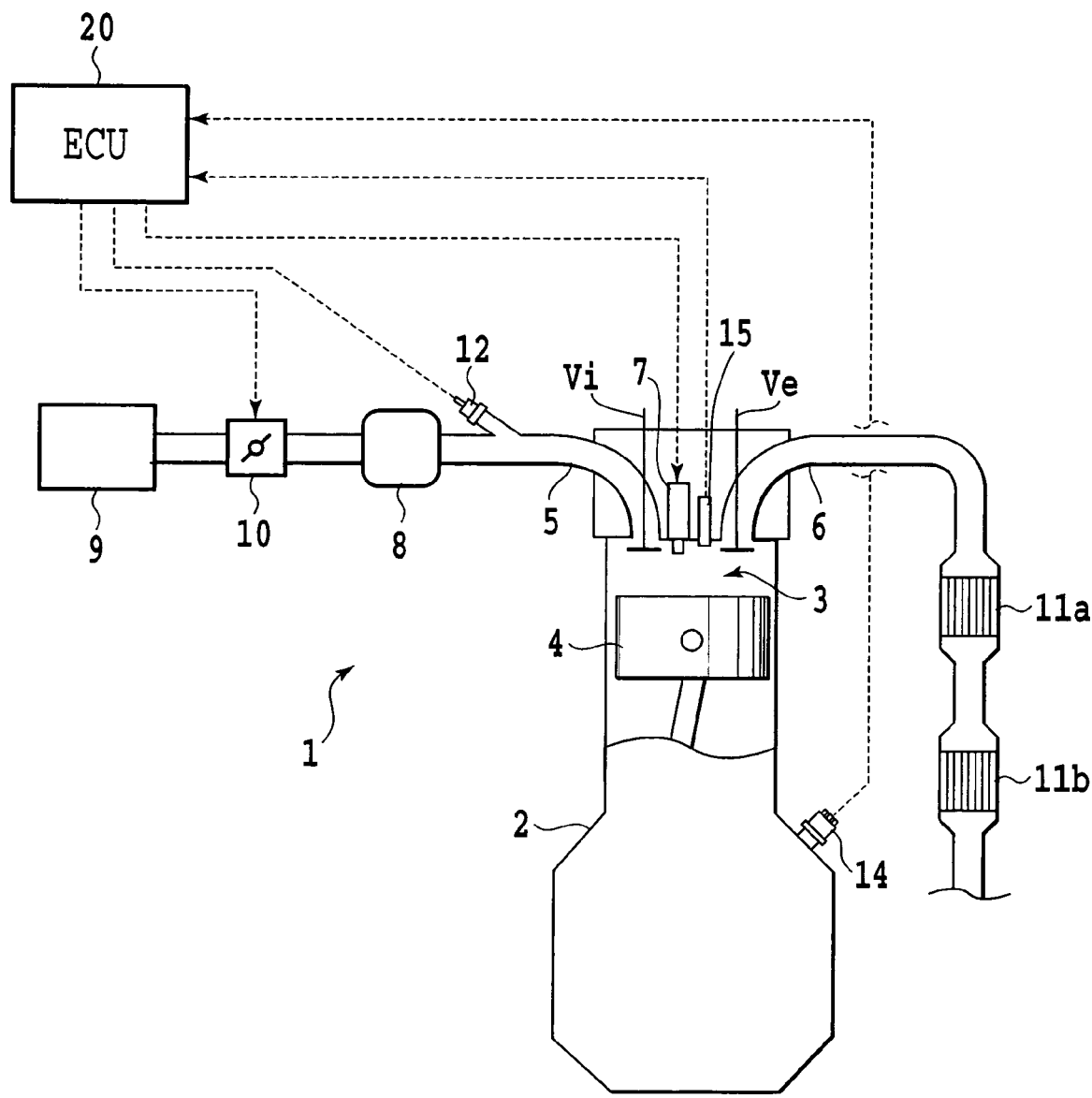
FIG. 4 is a schematic construction view of an internal combustion engine in the present invention.

FIG. 4 is a schematic construction view showing an internal combustion engine according to the present invention. An internal combustion engine 1 shown in the same figure burns a mixture of fuel and air inside a combustion chamber 3 formed in a cylinder block 2 and reciprocates a piston 4 inside the combustion chamber 3 to produce power. The internal combustion engine 1 is preferably constructed of a multi-cylinder engine and the internal combustion engine 1 in the present embodiment is constructed of, for example, a four-cylinder engine.

An intake port of each combustion chamber 3 is respectively connected to an intake pipe (an intake manifold) 5 and an exhaust port of each combustion chamber 3 is respectively connected to an exhaust pipe (an exhaust manifold) 6. In addition, an intake valve Vi and an exhaust valve Ve are disposed for each chamber 3 in a cylinder head of the internal combustion engine 1. Each intake valve Vi opens/closes the associated intake port and each exhaust valve Ve opens/closes the associated exhaust port. Each intake valve Vi and each exhaust valve Ve are activated by, for example, a valve operating mechanism (not shown) including a variable valve timing function. Further, the internal combustion engine 1 is provided with ignition plugs 7 the number of which corresponds to the number of the cylinders and the ignition plug 7 is disposed in the cylinder head for exposure to the associated combustion chamber 3.

The intake pipe 5 is, as shown in FIG. 4, connected to a surge tank 8. An air supply line L1 is connected to the surge tank 8 and is connected to an air inlet (not shown) via an air cleaner 9. A throttle valve 10 (electronically controlled throttle valve in the present embodiment) is incorporated in the halfway of the air supply line L1 (between the surge tank 8 and the air cleaner 9). On the other hand, a pre-catalyst device 11a including a three-way catalyst and a post-catalyst device 11b including NOx occlusion reduction catalyst are, as shown in FIG. 4, connected to the exhaust pipe 6.

Further, the internal combustion engine 1 is provided with a plurality of injectors 12, each of which is, as shown in FIG. 4, disposed to be exposed to an inside (inside an intake port) of the associated intake manifold 5. Each injector 12 injects fuel such as gasoline into an inside of each intake manifold 5.

It should be noted that the internal combustion engine 1 of the present embodiment is explained as so-called a port injection gasoline engine, but not limited thereto, and the present invention may be applied to an internal combustion engine of so-called a direct injection type. In addition, the present invention is applied not only to a gasoline engine but also to a diesel engine.

Each ignition plug 7, the throttle valve 10, each injector 12, the valve operating mechanism and the like as described above are electrically connected to an ECU 20 which acts as a control apparatus of the internal combustion engine 1. The ECU 20 includes a CPU, a ROM, a RAM, an input and an output port, a memory apparatus and the like (any of them is not shown). Various types of sensors including a crank angle sensor 14 of the internal combustion engine 1 are, as shown in FIG. 4, connected electrically to the ECU 20. The ECU 20 uses various types of maps stored in the memory apparatus and also controls the ignition plugs 7, the throttle valve 10, the injectors 12, the valve operating mechanism and the like for a desired output based upon detection values of the various types of sensors or the like.

In addition, the internal combustion engine 1 includes in-cylinder pressure sensors 15 (in-cylinder pressure detecting means) the number of which corresponds to the number of the cylinders, each provided with a semiconductor element, a piezoelectric element, a fiber optical sensing element or the like. Each in-cylinder pressure sensor 15 is disposed in the cylinder head in such a way that the pressure-receiving face thereof is exposed to the associated combustion chamber 3 and is electrically connected to the ECU 20. Each in-cylinder pressure sensor 15 detects an in-cylinder pressure in the associated combustion chamber 3 to supply a signal showing the detection value to the ECU 20.

Next, the timing of the combustion starting of the internal combustion engine 1, i.e. a control procedure of the ignition timing will be explained with reference to FIG. 5.

Figure 5:
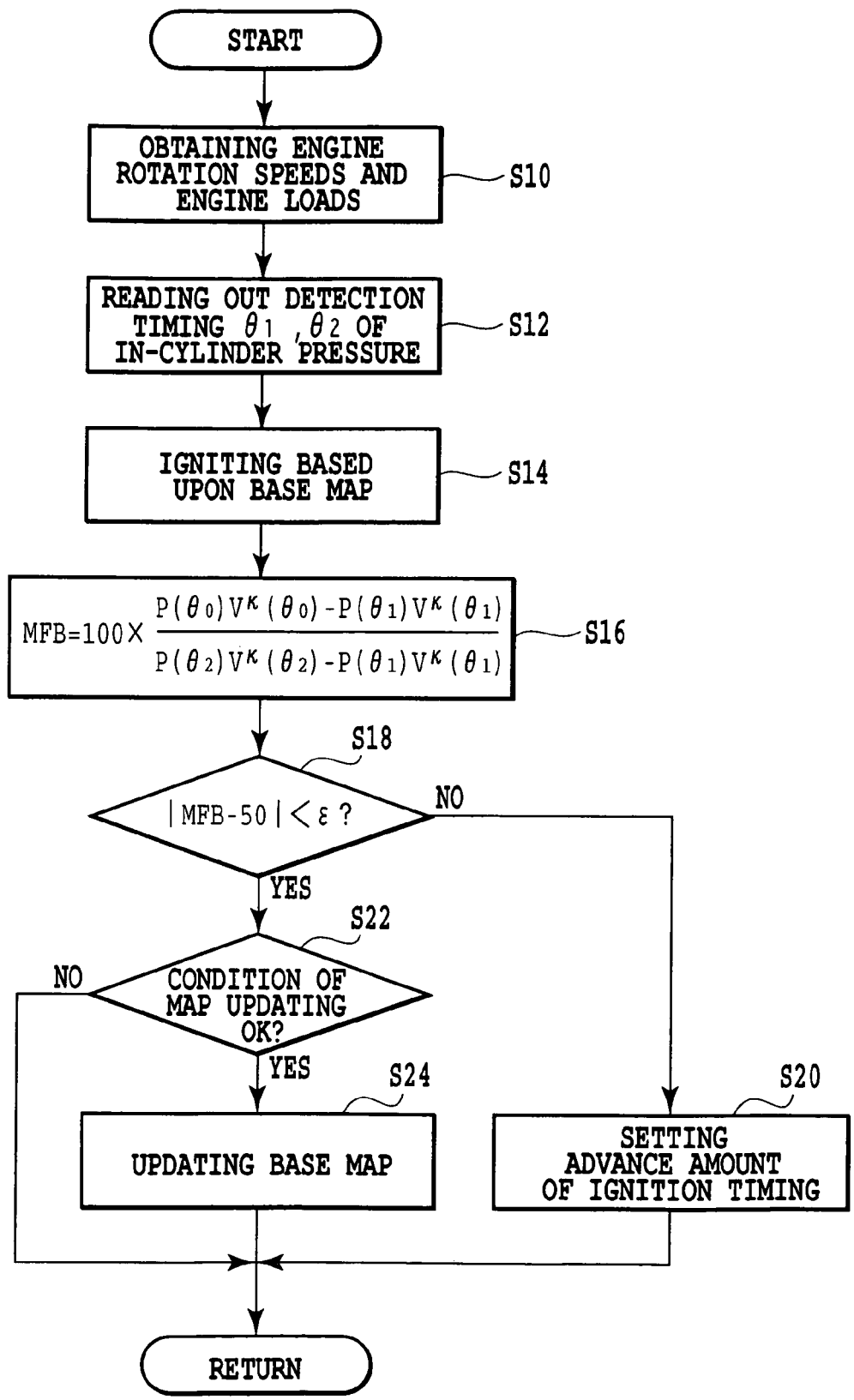
FIG. 5 is a flow chart for explaining an example of control procedures in ignition timing for the internal combustion engine in FIG. 4.

When the internal combustion engine 1 is started and thereafter, is transferred from an idling state to an idling-off state, as shown in FIG. 5, the ECU 20 obtains an engine rotation speed based upon a signal from the crank angle sensor 14 and also a load of the internal combustion engine 1 based upon an intake air quantity (step S10). When the engine rotation speed and the engine load of the internal combustion engine 1 are obtained, the ECU 20 determines the timing of the combustion starting in each combustion chamber 3, i.e. crank angles θ1 and θ2 defining detection timing of an in-cylinder pressure required for controlling the ignition timing by each ignition plug 7. In the present embodiment, a map (three dimensional map) for defining the detection timing (crank angles θ1 and θ2) of an in-cylinder pressure in accordance with the engine rotation speed and the engine load is in advance prepared. The ECU 20 reads out the crank angles θ1 and θ2 in accordance with the engine rotation speed and the engine load of the internal combustion engine 1 obtained at step S10 from this map (step S12).

In the map, one crank angle θ1 defining the detection timing of the in-cylinder pressure is set as a value (for example, −60°) after the opening of an intake valve and before the combustion starting (before ignition). It is preferable that the crank angle θ1 is set at the timing sufficiently earlier prior to the time (ignition time) when combustion starts in each combustion chamber 3. In the map, the other crank angle θ2 defining the detection timing of the in-cylinder pressure is set as a value (for example, 90°) after the combustion starting (ignition) and before the opening of an exhaust valve. It is preferable that the crank angle θ2 is set at the timing when combustion of a mixture in the combustion chamber 3 is substantially completed.

After the processing at step S12, the ECU 20 performs ignition by the ignition plug 7 according to a base map for ignition control (step S14). In addition, the ECU 20 monitors a crank angle of the internal combustion engine 1 based upon a signal from the crank angle sensor 14. And after and before performing ignition of a mixture by each ignition plug 7 at step S14, at first timing when a crank angle=θ1, at second timing when a crank angle=θ2 and further, at predetermined timing which is set between the first timing and the second timing and when a crank angle=θ0, (note that θ1<θ0<θ2), the ECU 20 determines an in-cylinder pressure P (θ1), P (θ0) or P (θ2) when a crank angle in each combustion chamber 3 becomes θ1, θ0 or θ2 based upon a signal from the in-cylinder pressure sensor 15. In the present embodiment, the predetermined timing between the first timing and the second timing is set at timing when a crank angle (θ0)=8° (8° after a top dead center) in which it is experimentally and experientially known that the combustion rate is approximately 50%. Note that the crank angle in which the combustion rate becomes about 50% changes with a cooling loss of an internal combustion engine and becomes a little after or before 8° after a top dead center depending on the kind of the internal combustion engine. In addition, in a case of performing a stratified charge combustion operating or in a case of a diesel engine, when optimal timing of combustion starting (MBT) is determined in accordance with each case, a combustion rate in the MBT can be easily calculated.

At the timing when the ignition timing control at step S14 and the detection of the in-cylinder pressure at the second timing are completed, the ECU 20 calculates a control parameter P (θ1)·V$^k$ (θ1) in each combustion chamber 3 which is a product of the in-cylinder pressure P (θ1) and a value obtained by exponentiating an in-cylinder volume V (θ1) at the timing of detecting the in-cylinder pressure P (θ1), i.e. at the time when the crank angle becomes θ1 with a ratio κ (κ=1.32 in the present embodiment) of specific heat. At this point, the ECU 20 calculates a control parameter P (θ0)·V$^k$ (θ0) in each combustion chamber 3 which is a product of an in-cylinder pressure P (θ0) and a value obtained by exponentiating an in-cylinder volume V (θ0) at the time when the crank angle becomes (θ0) with a ratio κ of specific heat and a control parameter P (θ2)·V$^k$ (θ2) in each combustion chamber 3 which is a product of an in-cylinder pressure P (θ2) and a value obtained by exponentiating an in-cylinder volume V (θ2) at the time when the crank angle becomes θ2 with a ratio κ of specific heat. Note that the values V$^k$ (θ1), V$^k$ (θ0) and V$^k$ (θ2) are in advance calculated and then, stored in the memory apparatus.

In addition, the ECU 20 calculates a combustion rate MBT at the timing when a crank angle becomes θ0 using the control parameters P (θ1)·V$^k$ (θ1), P (θ0)·V$^k$ (θ0) and P (θ2)·V$^k$ (θ2) when the crank angle becomes θ1, θ0 and θ2 from the following (5) expression (step S16).

[Expression 5]

$$MFB = \frac{P(\theta_0) \cdot V^k(\theta_0) - P(\theta_1) \cdot V^k(\theta_1)}{P(\theta_2) \cdot V^k(\theta_2) - P(\theta_1) \cdot V^k(\theta_1)} \times 100(\%) \qquad (5)$$

Thereby, the combustion rate MFB in each combustion chamber 3 is accurately determined from the in-cylinder pressures detected at three points when a crank angle becomes θ1, θ0 and θ2. In the present embodiment, after the combustion rate MBF in each combustion chamber 3 is determined, an average value of the combustion rates MBF in all combustion chambers 3 is calculated.

After the average value of the combustion rate MBF is calculated at step S16, the ECU 20 judges whether or not an absolute value |MFB−50| of a value obtained by subtracting 50 from the determined average value of the combustion rate MFB is below a predetermined threshold value ε (positive predetermined value) (step S18). That is, at step S18, a deviation between the average value of the combustion rate MBF calculated at step S16 when a crank angle θ0=8° and a theoretical value (target value) 50% of the combustion rate when a crank angle θ0=8° is determined. Further, at step S18, it is judged whether or not the deviation is below the threshold value ε and beyond the threshold value −ε.

In the internal combustion engine 1 of the present embodiment, a base map for ignition control adapted relatively roughly is prepared. Therefore, in a case working hours of the internal combustion engine 1 are relatively short, it is judged in more cases that an absolute value |MFB−50| is beyond a predetermined threshold value ε. In a case at step it is judged that S18, an absolute value |MFB−50| is beyond a predetermined threshold value ε, the ECU 20 calculates a correction amount (advance amount or retard amount) of ignition timing by each ignition plug 7 in accordance with the deviation (MFB−50) between the average value of the combustion rate MFB calculated at step S16 and a target value (50%), i.e. so that the deviation (MFB−50) becomes zero (step S20).

In a case at step S20, the deviation (MFB−50) between the average value of the combustion rate MFB calculated at step S16 and the target value is a negative value, an advance amount of the ignition timing is set in accordance with the deviation (MFB−50). In a case at step S20, the deviation (MFB−50) between the average value of the combustion rate MFB calculated at step S16 and the target value is a positive value, a retard amount of the ignition timing is set in accordance with the deviation (MFB−50). Thereby, the ignition timing (timing of combustion starting) by each ignition plug 7 is corrected so that the combustion rate MFB (average value) determined based upon the control parameter P V$^k$ is equal to the target value. As a result, it is possible to simply optimize the ignition timing by each ignition plug 7 at lower loads, thus producing large torque from the internal combustion engine 1 without occurrence of knocking.

After the processing at step S20, the ECU 20 goes back to step S10, and then, the processing at step S10 and step S12 is performed. Thereafter, an ignition of the mixture is performed by each ignition plug 7 according to the base map for ignition control and also in consideration of the correction amount of the ignition timing set at step S20 (adding and subtracting the correction amount) (step S14). And at the timing when a crank angle becomes θ1, θ0 or θ2 immediately after or before performing the ignition of the mixture by each ignition plug 7 at step S14, the ECU 20 determines in-cylinder pressures P (θ1), P (θ0) and P (θ2) in each combustion chamber 3 based upon a signal from the in-cylinder pressure sensor 15 and further, calculates a combustion rate MFB (average value) at the timing when a crank angle becomes θ0 (step S16).

Further, the ECU 20 judges again whether or not an absolute value |MFB−50| as a value obtained by subtracting 50 from the average value of the combustion rate MFB determined at step S18 is below a predetermined threshold value ε (predetermined positive value). In a case it is judged at this step that the absolute value |MFB−50| is beyond the predetermined threshold value ε, the ECU 20 sets a correction amount of the ignition timing by each ignition plug 7 and repeats the processing subsequent to step S10.

On the other hand, it is judged at step S18 that the absolute value |MFB−50| is below the predetermined threshold value ε, the ECU 20 judges whether or not a predetermined condition for updating the base map for ignition control is met (step S22). In a case of the judgment of "yes" at step S22, the ECU 20 updates the base map for ignition control based upon the correction amount set at step S20 prior to this time's ignition by each ignition plug 7 (step S24). Accordingly, even if the base map for ignition control is relatively roughly adapted in an initial stage, as the working hours of the internal combustion engine 1 become longer, the base map for ignition control is further updated in accordance with operational states or circumstances of the internal combustion engine 1. As a result, it is possible to reduce costs required for adaptation of the base map for ignition control in the internal combustion engine 1, as well as it is possible to improve accuracy of ignition timing control itself using the base map for ignition control.

Figure 6:
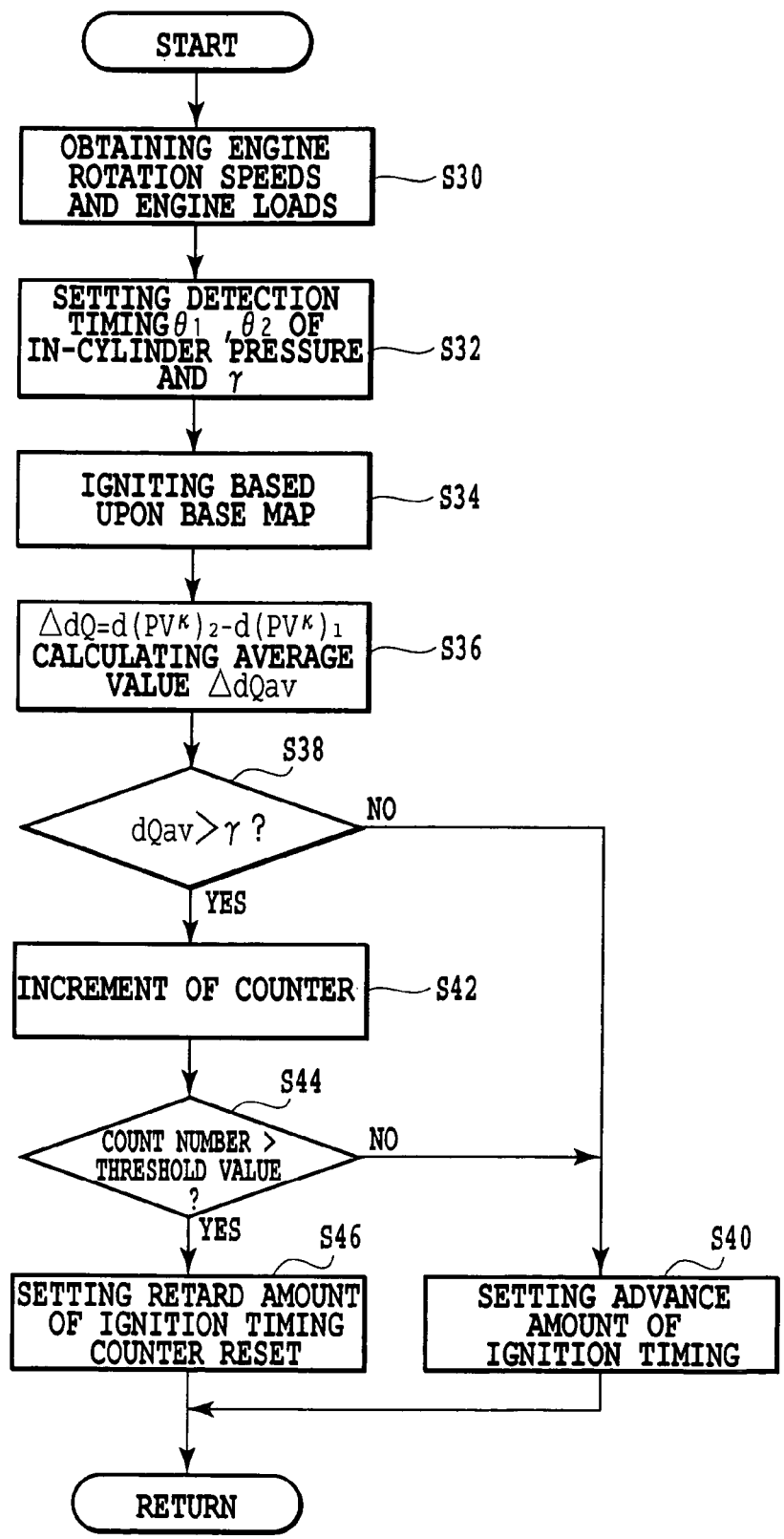
FIG. 6 is a flow chart for explaining another example of control procedures in the ignition timing for the internal combustion engine in FIG. 4.

FIG. 6 is a flow chart for explaining another procedure of the ignition timing control (control procedure in regard to the timing of the combustion starting) which is capable of being performed in the above-mentioned internal combustion engine 1.

In a case the ignition timing by each ignition plug 7 is controlled according to FIG. 6, when the internal combustion engine 1 is started and thereafter, is transferred from an idling state to an idling-off state, the ECU 20 obtains an engine rotation speed based upon a signal from a crank angle sensor and also a load of the internal combustion engine 1 based upon an intake air quantity (step S30). When the engine rotation speed and the engine load of the internal combustion engine 1 are obtained, the ECU 20 determines timing of the combustion starting in each combustion chamber 3, i.e. crank angles θ1, θ2 and a threshold value γ defining detection timing of an in-cylinder pressure required for controlling the ignition timing by each ignition plug 7.

In the present embodiment, a map for defining detection timing (crank angles θ1 and θ2) of an in-cylinder pressure and a threshold value in accordance with engine rotation speeds and engine loads is in advance prepared. The ECU 20 reads out the crank angles θ1 and θ2 and threshold value γ in accordance with the engine rotation speed and the engine load of the internal combustion engine 1 obtained at step S10 from this map (step S32).

In the map, one crank angle θ1 defining the detection timing of the in-cylinder pressure is experimentally and experientially set as a value (for example, 15°) before the region where knocking is more likely to occur. And in the map, the other crank angle θ2 defining the detection timing of the in-cylinder pressure is experimentally and experientially set as a value (for example, 20°) after the above-mentioned region where knocking is more likely to occur.

After the processing at step S32, the ECU 20 performs ignition by each ignition plug 7 according to the base map for ignition control (step S34). In addition, the ECU 20 monitors a crank angle of the internal combustion engine 1 based upon a signal from the crank angle sensor 14. When the crank angle is monitored as first timing as θ1, the ECU 20 determines an in-cylinder pressure P (θ1) at that point, and when the crank angle changes into the timing which is advanced by a minute crank angle (for example, δ=1° [1 CA]) from the first timing, the ECU 20 determines an in-cylinder pressure P (θ1+δ) at that point. Thereafter, when the crank angle is monitored as second timing as θ2, the ECU 20 determines an in-cylinder pressure P (θ2) at that point, and when the crank angle changes into the timing which is advanced by a minute crank angle (for example, δ=1° [1 CA]) from the second timing, the ECU 20 determines an in-cylinder pressure P (θ2+δ) at that point.

From the in-cylinder pressures P (θ1), P (θ1+δ), P (θ2), and P (θ2+δ) thus detected at four points, the ECU 20 determines d (P V$^κ$)1 showing a heat production rate at the first timing when a crank angle is θ1 and d (P V$^κ$)2 showing a heat production rate at the second timing when a crank angle is θ2 in each combustion chamber 3.

As described above, by using the control parameter P V$^κ$, a heat production rate at the timing when a crank angle becomes θ1 or θ2 is accurately determined without requiring calculating processing with high loads as a difference in control parameter P V$^κ$ between two predetermined points (between minute crank angle δ) P V$^κ$, i.e.

[Expression 6]

$$d(PV^κ)1 = \frac{1}{δ}\{P(θ1+δ)·V^κ(θ1+δ) - P(θ1)·V^κ(θ1)\} \quad (6)$$

[Expression 7]

$$d(PV^κ)2 = \frac{1}{δ}\{P(θ2+δ)·V^κ(θ2+δ) - P(θ2)·V^κ(θ2)\} \quad (7)$$

(where, κ=1.32 in the present embodiment). Note that the values V$^κ$ (θ1), V$^κ$ (θ1+δ), V$^κ$ (θ2) and V$^κ$ (θ2+δ) are in advance calculated and then, stored in the memory apparatus.

Further, the ECU 20 calculates a deviation Δ dQ between a heat production rate d (P V$^κ$)2 at the second timing when a crank angle becomes θ2 and a heat production rated (PV$^κ$)1 at the first timing when a crank angle becomes θ1 as Δ dQ=d (P V$^κ$)2–d (P V$^κ$)1 in each combustion chamber 3, and also calculates an average value Δ dQ av of the deviations Δ dQ in all combustion chambers 3. In addition, the ECU 20 compares the average value Δ dQ av of the deviation Δ dQ determined at step S36 with the threshold value γ read out at step S32 (step S38). Herein, it is known that when knocking occurs in the combustion chamber 3, the heat production rate in the combustion chamber 3 temporarily and sharply increases and thereafter, rapidly decreases (combustion early ends). In consideration of such phenomenon, when a changing amount in heat production rate between the first timing (crank angle=θ1) and the second timing (crank angle=θ2) set at step S12, i. e. the average value Δ dQ av of the deviation Δ dQ is beyond the predetermined threshold value γ, the ECU 20 of the internal combustion engine 1 judges that knocking has occurred in the combustion chamber 3, and when the average value Δ dQ av of the deviation Δ dQ is below the predetermined threshold value γ, the ECU 20 judges that the knocking has not occurred in the combustion chamber 3.

When the ECU 20 judges at step S38 that the average value ΔdQ av of the deviation Δ dQ is below the predetermined threshold value γ and the knocking does not occur in the combustion chamber 3, the ECU 20 sets a predetermined advance amount of the ignition timing at step S40 or an advance amount of the ignition timing by each ignition plug 7 in accordance with the average value Δ dQ av calculated at step S38. Thereby, the timing of the combustion starting in each combustion chamber 3, i. e. the ignition timing by each ignition plug 7 can be set at a point as close as possible to the vicinity of the region where knocking tends to occur.

In this way, d (P V$^κ$) showing the heat production rate is determined based upon the control parameter P V$^κ$, as well as the ignition timing (timing of combustion starting) by each ignition plug 7 is corrected in accordance with an occurrence state of knocking obtained from a changing amount (deviation Δ dQ or average value Δ dQ av) of d (P V$^κ$) showing the heat production rate, whereby it is possible to simply optimize the ignition timing by each ignition plug 7 with less load, thus producing large torque from the internal combustion engine without occurrence of knocking. After the processing at step S40, the ECU 20 goes back to step S30, and then, the processing at step S30 and step S32 is performed. Thereafter, ignition of the mixture is performed by each ignition plug 7 according to the base map for ignition control and also in consideration of a correction amount of the ignition timing set at step S40 (adding and subtracting the correction amount) (step S34).

On the other hand, it is judged at step S38 that the average value Δ dQ av of the deviation Δ dQ is beyond the predetermined threshold value γ and the knocking occurs in the combustion chamber 3, the ECU 20 performs an increment of a counter by one (step S42). Thereafter, the ECU 20 judges whether or not a count value of the counter is beyond a predetermined threshold value (step S44). In a case the ECU 20 judges at step S44 that a count value of the counter is beyond the predetermined threshold value, i.e. in a case the ECU 20 judges that the number of occurrence of the knocking is beyond the threshold value, the ECU 20 sets a predetermined retard amount of ignition timing, as well as resets the counter (step S46). This prevents the ignition timing by each ignition plug 7 from being excessively advanced, thus making it possible to suppress occurrence of the knocking. After the processing of step S46, the ECU 20 goes back to step S30 and a series of processing subsequent to step S30 is repeated. On the other hand, in a case the ECU 20 judges at step S44 that a count value of the counter is not beyond the predetermined threshold value, i.e. in a case the ECU 20 judges that the number of the occurrence of the knocking is not beyond the threshold value, the ECU 20 sets an advance amount of the ignition timing at step S40. Thereby, in a case the occurrence of the knocking is within an allowable extent, the ignition timing by each ignition plug 7 is further advanced, thus producing large torque from the internal combustion engine 1.

Note that in an example of FIG. 6, the deviation Δ dQ of d (P V$^κ$) showing the heat production rate between the first timing (crank angle=θ1) and the second timing (crank angle=θ2) is determined at step S36, and presence or absence of occurrence of the knocking is judged by comparing an average value Δ dQ av of the deviation Δ dQ with a predetermined value γ, but is not limited thereto. That is, it is also possible to judge presence or absence of occurrence of the knocking by comparing d (P V$^κ$) showing the heat production rate at predetermined timing (one point) with a predetermined threshold value, and in a case d (P V$^κ$) showing the heat production rate at one point goes beyond the predetermined threshold value, it may be judged that the knocking has occurred. Further, at step S46, instead of setting a retard amount of the ignition timing, the ignition timing may be maintained at a value at the previous timing or at the timing before the previous timing.

INDUSTRIAL APPLICABILITY

The present invention is useful in realizing a control apparatus and a control method for an internal combustion engine with practicability which is simply able to perform highly accurate engine control with less load.

The invention claimed is:

1. A control apparatus for an internal combustion engine which generates power by burning a mixture of fuel and air in a cylinder thereof, comprising:
   in-cylinder pressure detecting means;
   calculating means to calculate a combustion rate at predetermined timing based upon the in-cylinder pressure detected by the in-cylinder pressure detecting means and an in-cylinder volume at timing of detecting the in-cylinder pressure; and
   correction means to correct timing of combustion starting in the cylinder so that the combustion rate calculated by the calculating means is equal to a target value,
   wherein the calculating means calculates the combustion rate at the predetermined timing based upon a control parameter including a product of the in-cylinder pressure detected by the in-cylinder pressure detecting means and a value obtained by exponentiating the in-cylinder volume at the timing of detecting the in-cylinder pressure with a predetermined index;
   the predetermined timing is set between first timing set after the opening of an intake valve and before the combustion starting and second timing set after the combustion starting and before the opening of an exhaust valve; and
   the calculating means calculates the combustion rate based upon a difference in the control parameter between the first and the second timing and a difference in the control parameter between the first timing and the predetermined timing.

2. The control apparatus for the internal combustion engine according to claim 1, wherein the combustion rate is calculated from in-cylinder pressures taken at only three crank angle positions per engine cycle.

3. The control apparatus for the internal combustion engine according to claim 1, wherein the index is a ratio of specific heat.

4. The control apparatus for the internal combustion engine according to claim 1, wherein a base map for ignition control is updated based upon the correction amount calculated when the difference between the combustion rate and the target value is equal to or smaller than a predetermined value.

5. A control apparatus for an internal combustion engine which generates power by burning a mixture of fuel and air in a cylinder thereof, comprising:
   in-cylinder pressure detecting means;
   calculating means to calculate a heat generation rate at predetermined first and second timings based upon a control parameter including a product of the in-cylinder pressure detected by the in-cylinder pressure detecting means and a value obtained by exponentiating an in-cylinder volume at the timing of detecting the in-cylinder pressure with a predetermined index; and
   correction means to correct timing of combustion starting in the cylinder based upon a deviation between the heat generation rate at the second timing and the heat generation rate at the first timing.

6. The control apparatus for the internal combustion engine according to claim 5, wherein:
   the calculating means calculates the heat generation rate based upon a difference in the control parameter between two predetermined points, and the correction means advances the timing of combustion starting when the deviation is equal to or smaller than a predetermined threshold value.

7. A control method for an internal combustion engine which generates power by burning a mixture of fuel and air comprising the steps of:
   (a) detecting an in-cylinder pressure;
   (b) calculating a combustion rate at predetermined timing based upon the in-cylinder pressure detected in the step (a) and an in-cylinder volume at timing of detecting the in-cylinder pressure; and
   (c) correcting timing of combustion starting in the cylinder so that the combustion rate calculated in the step (b) is equal to a target value,
   wherein the step (b) includes calculating the combustion rate at the predetermined timing based upon a control parameter including a product of the in-cylinder pressure detected in the step (a) and a value obtained by exponentiating the in-cylinder volume at the timing of detecting the in-cylinder pressure with a predetermined index;

the predetermined timing is set between first timing set after the opening of an intake valve and before the combustion starting and second timing set after the combustion starting and before the opening of an exhaust valve; and in the step (b), the combustion rate is calculated based upon a difference in the control parameter between the first and the second timing and a difference in the control parameter between the first timing and the predetermined timing.

8. The control method for the internal combustion engine according to claim 7, wherein the combustion rate is calculated from in-cylinder pressures taken at only three crank angle positions per engine cycle.

9. The control method for the internal combustion engine according to claim 7, wherein the index is a ratio of specific heat.

10. A control method for an internal combustion engine which generates power by burning a mixture of fuel and air comprising the steps of:

(a) detecting an in-cylinder pressure;

(b) calculating a heat generation rate at predetermined first and second timings based upon a control parameter including a product of the in-cylinder pressure detected in step (a) and a value obtained by exponentiating the in-cylinder volume at the timing of detecting the in-cylinder pressure with a predetermined index; and (c) correcting timing of combustion starting in the cylinder based upon a deviation between the heat generation rate at the second timing and the heat generation rate at the first timing calculated in step (b).

11. The control method for the internal combustion engine according to claim 10, wherein:

step (b) includes calculating the heat generation rate based upon a difference in the control parameter between two predetermined points, and the correcting step advances the timing of combustion starting when the deviation is equal to or smaller than a predetermined threshold value.

* * * * *